US012694563B2

(12) United States Patent
Griffith

(10) Patent No.: US 12,694,563 B2
(45) Date of Patent: Jul. 28, 2026

(54) SYSTEM AND METHOD FOR USING CAMERA POSE CONSTRAINTS ON STATIC AND DYNAMIC OBJECTS DETECTED IN IMAGES TO ESTIMATE CAMERA POSE

(71) Applicant: TuSimple, Inc., San Diego, CA (US)

(72) Inventor: Shane David Griffith, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 353 days.

(21) Appl. No.: 18/417,742

(22) Filed: Jan. 19, 2024

(65) Prior Publication Data

US 2024/0249435 A1      Jul. 25, 2024

Related U.S. Application Data

(60) Provisional application No. 63/480,906, filed on Jan. 20, 2023.

(51) Int. Cl.
G06T 7/73       (2017.01)
G06T 7/246      (2017.01)
G06T 7/38       (2017.01)

(52) U.S. Cl.
CPC ................ G06T 7/74 (2017.01); G06T 7/248 (2017.01); G06T 7/38 (2017.01); *G06T 2207/30244* (2013.01); *G06T 2207/30256* (2013.01)

(58) Field of Classification Search
CPC .......... G06V 20/64; G06V 20/56; G06T 7/00; G06T 7/70; G06T 2207/30244; G06T 2207/30248
See application file for complete search history.

(56) References Cited

U.S. PATENT DOCUMENTS

| | | | | |
|---|---|---|---|---|
| 11,702,089 | B2 | 7/2023 | Griffith et al. | |
| 2017/0116735 | A1* | 4/2017 | Aughey | G06V 20/17 |
| 2017/0124781 | A1* | 5/2017 | Douillard | G08G 1/207 |
| 2019/0108651 | A1* | 4/2019 | Gu | G06T 7/579 |
| 2019/0206084 | A1* | 7/2019 | Noble | G06V 40/19 |
| 2019/0258251 | A1* | 8/2019 | Ditty | B60W 60/0015 |
| 2019/0295291 | A1* | 9/2019 | Raag | G06T 7/85 |
| 2019/0370997 | A1* | 12/2019 | Hou | G06T 7/74 |
| 2020/0134866 | A1* | 4/2020 | Kitaura | G06T 7/74 |

(Continued)

FOREIGN PATENT DOCUMENTS

| | | | | | |
|---|---|---|---|---|---|
| CN | 115272494 | A | * 11/2022 | | G06V 10/44 |
| CN | 115482282 | A | * 12/2022 | | G01C 21/3804 |

*Primary Examiner* — Guillermo M Rivera-Martinez
(74) *Attorney, Agent, or Firm* — Perkins Coie LLP

(57)       ABSTRACT

System and method for using dynamic objects for camera pose estimation are disclosed. In one aspect, the method includes receiving a first image from a camera of an autonomous vehicle and acquiring first camera pose constraints based on one or more static objects detected in the first image. The method further includes receiving a second image from the camera and acquiring second camera pose constraints based on one or more static objects detected in the second image. The method further includes acquiring third camera pose constraints based on one or more dynamic objects detected in the first and the second image. The method finally includes an estimation of at least one pose of the camera that satisfies the first camera pose constraints, the second camera pose constraints, and the third camera pose constraints.

20 Claims, 5 Drawing Sheets

(56)          References Cited

U.S. PATENT DOCUMENTS

| | | | |
|---|---|---|---|
| 2021/0024081 A1* | 1/2021 | Johnson-Roberson | ...................... G01S 17/89 |
| 2021/0118184 A1* | 4/2021 | Pillai | ................... G06F 9/30196 |
| 2021/0319584 A1* | 10/2021 | Qian | .................... G06V 20/588 |
| 2022/0172386 A1* | 6/2022 | Liu | ...................... G06V 10/774 |
| 2022/0227380 A1* | 7/2022 | Griffith | ................... G06T 7/246 |
| 2022/0292711 A1* | 9/2022 | Pan | ........................... G06T 7/38 |
| 2022/0301206 A1* | 9/2022 | Guizilini | .................. G06T 7/55 |

* cited by examiner

SYSTEM AND METHOD FOR USING CAMERA POSE CONSTRAINTS ON STATIC AND DYNAMIC OBJECTS DETECTED IN IMAGES TO ESTIMATE CAMERA POSE

CROSS-REFERENCE TO RELATED APPLICATION(S)

This application claims the benefit of U.S. Provisional Application No. 63/480,906, filed Jan. 20, 2023. The foregoing application is hereby incorporated by reference in its entirety. Any and all applications for which a foreign or domestic priority claim is identified in the Application Data Sheet as filed with the present application are hereby incorporated by reference under 37 CFR 1.57.

BACKGROUND

Technical Field

The present disclosure relates generally to autonomous vehicles. More particularly, the present disclosure is related to techniques to estimate the rotation of a camera located on or in a vehicle. The technique also provides a metric to estimate the relative camera orientation error.

Description of the Related Technology

A vehicle can include cameras attached to the vehicle for several purposes. For example, cameras can be attached to a roof of the vehicle for security purposes, for driving aid, or for facilitating autonomous driving. Cameras mounted on a vehicle can obtain images of one or more areas surrounding the vehicle. These images can be processed to obtain information about the road or about the objects surrounding the vehicle. For example, images obtained by a camera can be analyzed to determine the distances of other vehicles surrounding the autonomous vehicle so that the autonomous vehicle can be safely maneuvered around them. The accuracy of data obtained from a camera can be further improved by producing an accurate estimation of the pose of the camera.

SUMMARY OF CERTAIN INVENTIVE ASPECTS

In one aspect, there is provided a method comprising: receiving a first image from a camera of an autonomous vehicle; acquiring first camera pose constraints based on one or more static objects detected in the first image; receiving a second image from the camera; acquiring second camera pose constraints based on one or more static objects detected in the second image; acquiring third camera pose constraints based on one or more dynamic objects detected in both the first and the second images; and estimating at least one pose of the camera that satisfies the first camera pose constraints, the second camera pose constraints, and the third camera pose constraints.

In some embodiments, the one or more dynamic objects comprise vehicles traveling in a similar direction as the autonomous vehicle.

In some embodiments, the vehicles traveling in a similar direction as the autonomous vehicle are at least a threshold distance from the autonomous vehicle.

In some embodiments, the threshold distance is 75 meters.

In some embodiments, the method further comprises: detecting locations of the one or more dynamic objects in the first and the second images; matching 2D points that are detected on the one or more dynamic objects in the first image to 2D points that are detected on the same objects in the second image; estimating a homography from orientations of a first camera pose associated with the first image and a second camera pose associated with the second image; projecting the 2D points on the one or more dynamic objects in the first image to the second image; correcting the location of each projected 2D point using a kinematic estimate of the one or more dynamic objects; and minimizing an error between the location of the projected 2D point to the location of the detected 2D point in the second image.

In some embodiments, correcting the location of each projected 2D point comprises: receiving an estimate of a 3D position and a 3D velocity for each of the one or more dynamic objects; projecting each of the 3D position and velocity estimates into one of the first and second images to get a 2D vector; and adding the 2D vector to each projected 2D point on the same dynamic object.

In some embodiments, estimating the homography is simplified due to one or more assumptions regarding relative motion between the autonomous vehicle and the one or more dynamic objects.

In some embodiments, the one or more static objects comprise stationary lane markings.

In some embodiments, estimating the at least one pose of the camera comprises aligning the stationary lane markings in one of the first and the second images with lane markings from a projected 3D map of a roadway.

In some embodiments, the method further comprises: detecting the one or more dynamic objects in the first and the second images; identifying a subset of the one or more dynamic objects that are within a threshold distance of the autonomous vehicle; and removing the subset of the one or more dynamic objects from an estimation of at least one of the poses of the camera.

In some embodiments, the method further comprises: extracting local image features for the one or more dynamic objects detected in the first and the second images; and matching the one or more dynamic objects between the first and the second images based on the extracted local image features.

In some embodiments, the method further comprises: causing the autonomous vehicle to navigate a roadway based at least in part on the estimation of the poses of the camera.

Another aspect is an apparatus comprising: at least one processor; and at least one memory including computer program code, the at least one memory and the computer program code configured to, with the at least one processor, cause the apparatus to: receive a first image from a camera of an autonomous vehicle; acquire first camera pose constraints based on one or more static objects detected in the first image; receive a second image from the camera; acquire second camera pose constraints based on one or more static objects detected in the second image; acquire third camera pose constraints based on one or more dynamic objects detected in both the first and the second images; and estimate at least one pose of the camera that satisfies the first camera pose constraints, the second camera pose constraints, and the third camera pose constraints.

In some embodiments, the computer program code is further configured to cause the apparatus to: extract one or more features for each of the one or more dynamic objects in the first and the second images; and match the one or more dynamic objects in the first and the second images based on the extracted one or more features.

In some embodiments, the estimation of the at least one the pose of the camera is further based on the extracted one or more features for the matched one or more dynamic objects.

In some embodiments, the computer program code is further configured to cause the apparatus to: determine a relative position and velocity of each of the one or more dynamic objects with respect to the autonomous vehicle, wherein estimating the at least one the pose of the camera is further based on correcting locations of the one or more dynamic objects based on the relative position and velocity.

Yet another aspect is a non-transitory computer-readable medium storing computer program instructions which, when executed by at least one processor, cause the at least one processor to: receive a first image from a camera of an autonomous vehicle; acquire first camera pose constraints based on one or more static objects detected in the first image; receive a second image from the camera; acquire second camera pose constraints based on one or more static objects detected in the second image; acquire third camera pose constraints based on one or more dynamic objects detected in both the first and the second images; and estimate poses of the camera that satisfy the first camera pose constraints, the second camera pose constraints, and the third camera pose constraints.

In some embodiments, the estimation of the at least one of the pose of the camera is further based on a simplification of relative motion between the autonomous vehicle and the one or more dynamic objects.

In some embodiments, the simplification involves assuming a location for the one or more dynamic objects is in a plane at a distance of infinity from the autonomous vehicle.

In some embodiments, the one or more dynamic objects comprise vehicles traveling in a similar direction as the autonomous vehicle.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

An autonomous vehicle can include cameras to obtain images of one or more areas surrounding the autonomous vehicle. These images can be analyzed by a computer on-board the autonomous vehicle to obtain distance or other information about the road or about the objects surrounding the autonomous vehicle. However, the computer on-board the autonomous vehicle can precisely and accurately detect an object and determine the distance of the object at least in part based on the pose of the cameras. Thus, it is desirable to accurately determine the pose of cameras on-board an autonomous vehicle to more accurately determine the location of object(s) in the environment.

Overview of Autonomous Vehicles

Figure 1A:
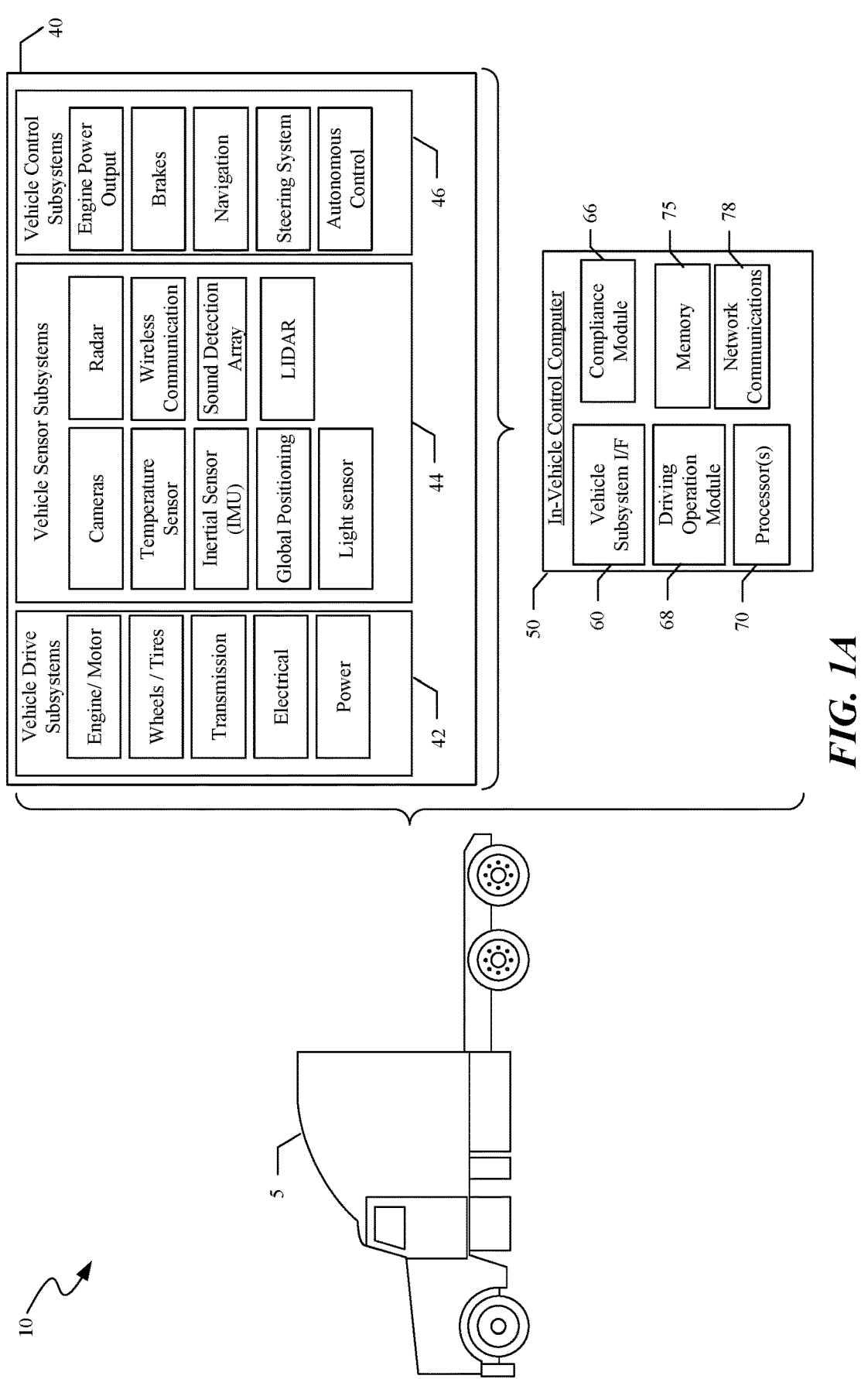
FIG. 1A shows a system that includes a tractor of an autonomous truck.

FIG. 1A shows a system 10 that includes a tractor 5 of an autonomous truck. The tractor 5 includes a plurality of vehicle subsystems 40 and an in-vehicle control computer 50. The plurality of vehicle subsystems 40 includes vehicle drive subsystems 42, vehicle sensor subsystems 44, and vehicle control subsystems. An engine or motor, wheels and tires, a transmission, an electrical subsystem, and a power subsystem can be included in the vehicle drive subsystems. The engine of the autonomous truck can be an internal combustion engine, a fuel-cell powered electric engine, a battery powered electrical engine, a hybrid engine, or any other type of engine capable of moving the wheels on which the tractor 5 moves. The tractor 5 can have multiple motors or actuators to drive the wheels of the vehicle, such that the vehicle drive subsystems 42 include two or more electrically driven motors. The transmission can include a continuous variable transmission or a set number of gears that translate the power created by the engine into a force that drives the wheels of the vehicle. The vehicle drive subsystems can include an electrical system that monitors and controls the distribution of electrical current to components within the system, including pumps, fans, and actuators. The power subsystem of the vehicle drive subsystem can include components that regulate the power source of the vehicle.

Vehicle sensor subsystems 44 can include sensors for general operation of the autonomous truck 5, including those which would indicate a malfunction in the AV. The sensors for general operation of the autonomous vehicle can include cameras, a temperature sensor, an inertial sensor (IMU), a global positioning system, a light sensor, a LIDAR system, a radar system, and wireless communications. In some embodiments, the sensors can include a sound detection array, such as a microphone or an array of microphones.

Cameras included in the vehicle sensor subsystems 44 can be rear-facing so that flashing lights from emergency vehicles can be observed from all around the autonomous truck 5. These cameras can include video cameras, cameras with filters for specific wavelengths, as well as any other cameras suitable to detect emergency vehicle lights based on color, flashing, of both color and flashing.

The vehicle control subsystem 46 can be configured to control operation of the autonomous vehicle, or truck, 5 and its components. Accordingly, the vehicle control subsystem 46 can include various elements such as an engine power output subsystem, a brake unit, a navigation unit, a steering system, and an autonomous control unit. The engine power subsystem can control the operation of the engine, including the torque produced or the horsepower provided, as well as control the gear selection of the transmission. The brake unit can include any combination of mechanisms configured to decelerate the autonomous vehicle 5. The brake unit can use friction to slow the wheels in a standard manner. The brake unit can include an anti-lock brake system (ABS) that can prevent the brakes from locking up when the brakes are applied. The navigation unit can be any system configured to determine a driving path or route for the autonomous vehicle 5. The navigation unit can additionally be configured to update the driving path dynamically while the autonomous vehicle 5 is in operation. In some embodiments, the navigation unit can be configured to incorporate data from the GPS device and one or more predetermined maps so as to determine the driving path for the autonomous vehicle 5.

The steering system can represent any combination of mechanisms that can be operable to adjust the heading of the autonomous vehicle 5 in an autonomous mode or in a driver-controlled mode.

The autonomous control unit can represent a control system configured to identify, evaluate, and avoid or otherwise negotiate potential obstacles in the environment of the autonomous vehicle 5. In general, the autonomous control unit can be configured to control the autonomous vehicle 5 for operation without a driver or to provide driver assistance in controlling the autonomous vehicle 5. In some embodiments, the autonomous control unit can be configured to incorporate data from the GPS device, the RADAR, the LiDAR (i.e., LIDAR), the cameras, and/or other vehicle subsystems to determine the driving path or the trajectory for the autonomous vehicle 5. The autonomous control that can activate systems that the AV 5 has which are not present in a conventional vehicle, including those systems which can allow an AV 5 to communicate with surrounding drivers or signal surrounding vehicles or drivers for safe operation of the AV 5.

An in-vehicle control computer 50, which can be referred to as a VCU, includes a vehicle subsystem interface 60, a driving operation module 68, one or more processors 70, a compliance module 66, a memory 75 (e.g., a "non-transitory storage medium"), and a network communications subsystem 78. This in-vehicle control computer 50 controls many, if not all, of the operations of the autonomous truck 5 in response to information from the various vehicle subsystems 40. The one or more processors 70 execute the operations that allow the system to determine the health of the AV, such as whether the AV has a malfunction or has encountered a situation requiring service or a deviation from normal operation and giving instructions. Data from the vehicle sensor subsystems 44 is provided to VCU 50 so that the determination of the status of the AV can be made. The compliance module 66 determines what action should be taken by the autonomous truck 5 to operate according to the applicable (i.e., local) regulations. Data from other vehicle sensor subsystems 44 can be provided to the compliance module 66 so that the best course of action in light of the AV's status can be appropriately determined and performed. Alternatively, or additionally, the compliance module 66 can determine the course of action in conjunction with another operational or control module, such as the driving operation module 68.

The memory 75 can contain additional instructions as well, including instructions to transmit data to, receive data from, interact with, or control one or more of the vehicle drive subsystems 42, the vehicle sensor subsystem 44, and the vehicle control subsystem 46 including the autonomous control system. The in-vehicle control computer (VCC) 50 can control the function of the autonomous vehicle 5 based on inputs received from various vehicle subsystems (e.g., the vehicle drive subsystems 42, the vehicle sensor subsystem 44, and the vehicle control subsystem 46). Additionally, the VCC 50 can send information to the vehicle control subsystems 46 to direct the trajectory, the velocity, signaling behaviors, and the like, of the autonomous vehicle 5. The autonomous control vehicle control subsystem can receive a course of action to be taken from the compliance module 66 of the VCC 50 and consequently relay instructions to other subsystems to execute the course of action.

Estimating Camera Rotation Using Dynamic Objects

Camera rotation estimation is described herein as the use of other vehicles and dynamic objects to estimate the rotation of a camera located on an autonomous vehicle.

Other vehicles on the road are a source of camera pose information because they move at substantially the same speed as the autonomous vehicle 5 and/or at a substantial distance away from the autonomous vehicle 5.

Following the mathematical properties of camera motion (also referred to as a "rotation model" or a "mathematical model" herein), when a camera undergoes pure rotation, the change in the 2D image location of all static objects in its images can be described by a 2D transform known as a homography. This property of a homography can also apply to objects that are relatively static with respect to a moving camera, such as vehicles that move with the same velocity as the camera. Additionally, when a camera undergoes both rotation and translation, the same 2D homography transform can also describe the change in the 2D image location of all static and dynamic objects in the image that are very far away (e.g., on the plane at infinity). In either case (the camera motion is relatively rotation-only, or all points are very far away (e.g., farther away from the camera than a threshold distance), the same mathematical model describes the change in the 2D image location of objects if the estimated rotation defining the homography is accurate.

When a homography is applicable as indicated, the computer 50 can apply the homography, $^{t1}H_{t0}$, to relate a 2D image location, $x_i$, in a first image at time t0 to the 2D location of the same point, $x_j$, in a second image at time t1, as:

$$\hat{x}_j = {}^{t1}H_{t0}x_i \qquad \text{Equation (1)}$$

The projected 2D image location, $\hat{x}_j$, matches the observed 2D image location, $x_j$, when the conditions hold and the homography $^{t1}H_{t0}$ is accurate. The homography $^{t1}H_{t0}$ is computed from the change in orientation of the camera pose, as follows:

$$^{t1}H_{t0} = K *{}^{cam\ t1}R_{world} *{}^{t0}R_{world}^T * K^{-1} = K *{}^{cam\ t1}R_{cam\ t1} * K^{-1} \qquad \text{Equation (2)}$$

where $$^{cam\ t0}R_{world}^T$$

is the camera orientation at time t0, $^{cam\ t1}R_{world}$ is the camera orientation at time t1, and K is the camera intrinsic for a pinhole camera model, which relates image pixel coordinates to the camera frame.

The homography can be used to define and constrain the value of the change in the camera orientation because it is a function of that value. That is, the error of the estimated coordinate $\hat{x}_j$ and the true coordinate $x_j$ is minimized by finding the change in camera orientation $\Delta R = {}^{cam\ t1}R_{cam\ t0}$ that satisfies:

$$\arg\min_{\Delta R} = \sum \left\| x_j - \pi_{\Delta R}(x_i) \right\|^2 \qquad \text{Equation (3)}$$

A non-linear least squares algorithm can be used to solve EQN. 3 for $\Delta R$. An accurate change in camera orientation, $\Delta R$, can be obtained when the sum of squared error is nearly zero and the model has been applied to a set of points for which it is applicable.

In the context of a camera located on the autonomous vehicle 5, the model in EQN. 3 is typically only applicable to a subset of the image points. Excluded image points can be, for example, those of some static objects such as lane markers, road signs, and buildings because those objects can move relative to the camera on the autonomous vehicle 5 while the autonomous vehicle 5 is in motion. Included image points can be, however, some dynamic objects such as other vehicles on a roadway. Some other vehicles can appear to be sufficiently static with respect to the position of the camera on the autonomous vehicle 5. Specifically, vehicles that satisfy the following conditions can be substantially static with respect to the autonomous vehicle 5: vehicles that are i) moving in substantially the same direction as the autonomous vehicle 5; ii) at substantially the same speed as the autonomous vehicle 5; and/or iii) beyond a predetermined distance away from the autonomous vehicle 5. In some embodiments, the predetermined direction is 10 deg to that of the autonomous vehicle 5, the predetermined speed is 7 m/s to that of the autonomous vehicle 5, and the predetermined distance is 180 m ahead of the autonomous vehicle 5. Vehicles that are excluded from the model by these filters are, for example, traveling along a curve or hill and/or closer to the autonomous vehicle 5 than the threshold distance.

Alternatively, a more accurate mathematical model for the change in the 2D image location of a dynamic object can be obtained if, instead of filtering, the homography model is corrected using the motion model of the object. That is, the homography model given in EQN. 1 is corrected using the kinematic term, $\Delta P$, as:

$$\hat{x}_j^{t1} = {}^{t1}H_{t0}x_i^{t0} + \Delta P \qquad \text{Equation (4)}$$

The kinematic correction for a vehicle is defined using the vehicle's 3D position and 3D velocity. The term, $\Delta P$, is defined as the change in the 2D image location of a projected 3D vehicle point, $$\Delta P = \hat{p}_{img}^{t1} - p_{img}^{t0}.$$

Here the 2D location of the projected 3D vehicle point at time t0 is $$p_{img}^{t0} = K * P_{cam}^{t0}, \text{ where } P_{cam}^{t0}$$

is the relative 3D position of the vehicle point at time t0, and K is the camera intrinsic. The estimated 2D location of the projected vehicle point at time t1 is $$t1 \text{ is } \hat{p}_{img}^{t1} = K * \hat{P}_{cam}^{t1}.$$

Here $$\hat{P}_{cam}^{t1}$$

is the estimated location of the 3D vehicle point at time t1. It is computed using the vehicle's relative velocity as, $$\hat{P}_{cam}^{t1} = P_{cam}^{t0} + v_{cam}^{t0} * \Delta t,$$

where $$v_{cam}^{t0}$$

the relative velocity of the vehicle at time t0, and $\Delta t = t1 - t0$.

Using this model, in some embodiments, vehicles are only filtered if they are within 75 m to the autonomous vehicle. Filtering vehicles by their direction and their speed can be unnecessary.

Dependencies

The model given in EQN. 4 defines a simple mathematical relationship, but it has several dependencies, which are described here. Specifically, in some embodiments, six different sources of information are utilized to form the model: 1) the detected subimages of each image and their content label (e.g., vehicle, traffic-sign, pole, etc.); 2) the relative position and velocity for each of the dynamic objects; 3) pairs of matched dynamic objects between two image frames; 4) multiple pairs of 2D image coordinates (i.e., $x_i, x_j$); 5) the camera intrinsic, K; and 6) the change in the camera orientation $\Delta R = {}^{cam_{t1}}R_{cam_{t0}}$. The following sections provide more detail for each of the dependencies.

1. Detected Subimages

In certain embodiments, a detection module is applied to detect all the vehicles in an image. Many objects relevant to driving can be detected, including other vehicles, pedestrians, traffic signs, traffic lights, poles, and more. A detection includes a type label, a bounding box, and a detection mask, wherein the type label specifies what the object is, the bounding box specifies a square subimage that encapsulates the object, and the detection mask specifies the pixels within the bounding box that are part of the object. An object can take more or less area of an image, the amount of which is proportionate to its distance from the camera. In some embodiments, vehicles can be detected beyond 1000 m away.

2. Vehicle Kinematics

In some embodiments, the computer 50 can be configured to run a vehicle estimation module, from which the vehicle kinematics are obtained. Vehicle estimation includes accumulating information about surrounding vehicles and then estimating certain properties of their states. Accurate estimates of vehicle positions and velocities are computed using the mathematical fusion of readings from RADAR, LiDAR, and the estimates from using camera pose and an HD map. The transmitted results contain the positions and the velocities for each of the detected vehicles.

In some embodiments, the computer 50 can be configured to filter vehicles (i.e., discard vehicles from further consideration) according to their distance to the autonomous vehicle 5. In some embodiments, the computer 50 can filter vehicles within 75 m when the images are captured from a long-range camera. Similarly, the computer 50 can filter vehicles within 50 m when the images are captured from a short-range camera.

3. Matched Dynamic Objects

In some embodiments, the autonomous vehicle 5 can apply one or more different matching techniques to identify the same dynamic object or vehicle between two frames. This provides a coarse-grained (e.g., subimage to subimage) match between two frames. For example, in some embodiments, the computer 50 can be configured to, for each vehicle identified in two frames (e.g., a current frame and a previous frame), identify the same vehicle in the two frames using a reidentification (REID) algorithm. After the computer 50 has identified subimages in a frame containing vehicles, the computer 50 can extract the REID descriptor for a subimage that corresponds to a vehicle, and then search for a matching REID descriptor from a previous frame. The subimages for two detected vehicles are matched if they have a very similar REID descriptor.

4. Extracted Image Coordinates

A correspondence of two subimages between two different frames define a coarse match, which the computer 50 can then hone using a fine-grained (e.g., pixel to pixel) data association algorithm. One type of fine-grained data association algorithm is local image features. The computer 50 can be configured to extract a plurality of local image features from each vehicle, in one embodiment those being oriented FAST and rotated BRIEF (ORB) local image features. The computer 50 can normalize the contrast of each image before extracting the local image features in order to obtain a larger number of features. In some embodiments, the computer can also use the detection mask to extract local image features from the areas of a subimage where the vehicle is present. The computer 50 can match features between two different images of a vehicle with the aid of a grid, which can reduce perceptual aliasing and result in a larger number of matches.

Figure 1B:
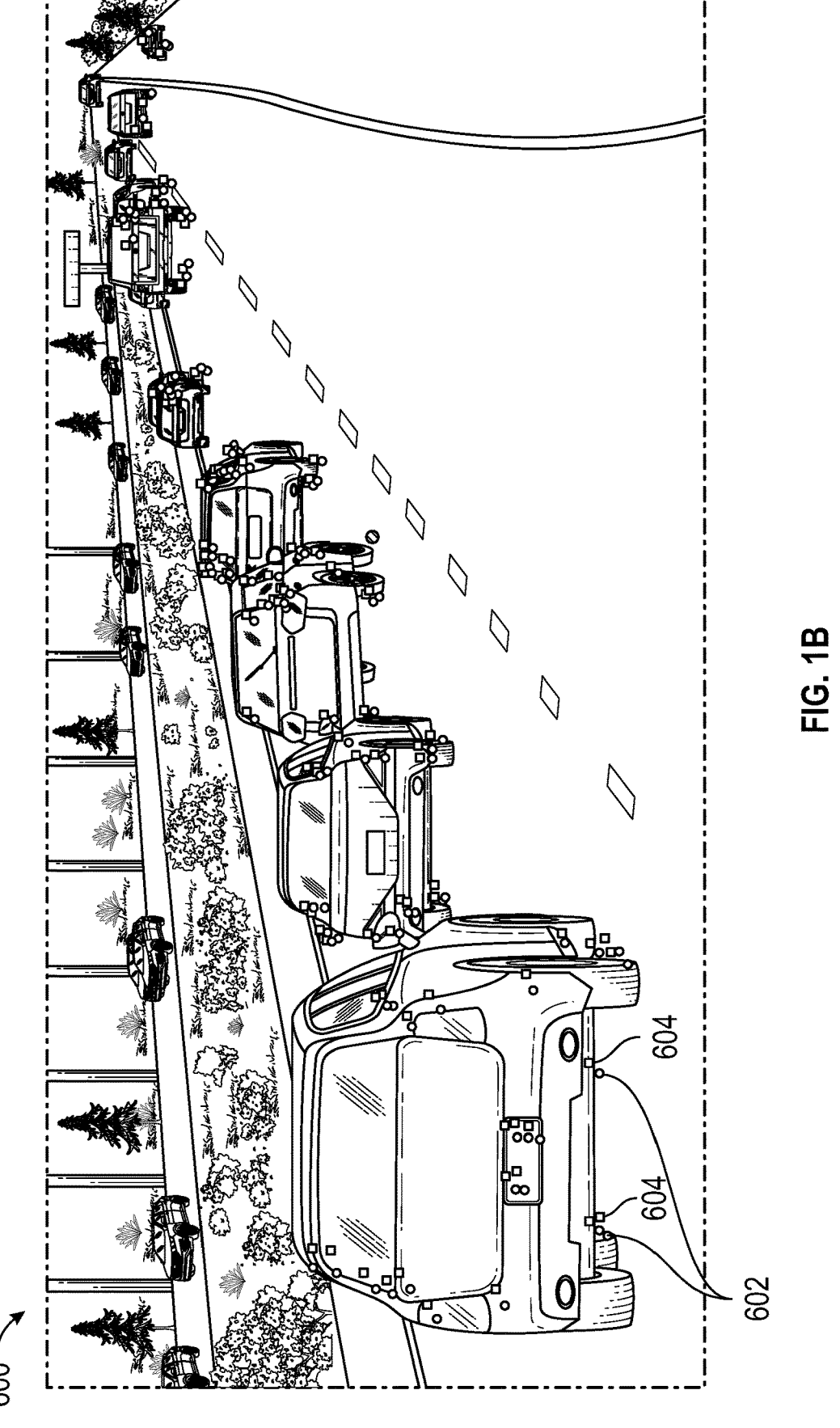
FIG. 1B shows an example image with local image features overlaid on the image in accordance with aspects of this disclosure.

FIG. 1B shows an example image 600 with local image features overlaid on the image 600 in accordance with aspects of this disclosure. The image includes first points 602 that represent local image features extracted from a first image and second points 604 that represent local image features extracted from a second image. The first and the second images can be consecutive images obtained using the camera of the autonomous vehicle 5, however, aspects of this disclosure are not limited thereto (e.g., there can be an image obtained between the two images) in certain implementations. The computer 50 can be configured to match the local image features between the two consecutive images such that each of the first points 602 either has a matching second point 604 or is discarded.

In the embodiment of FIG. 1B, the first points 602 are detected in a current image and the second points 604 are detected in the previous image. The computer 50 can project the second points 604 from the previous image into the current image to obtain the visualization of FIG. 1B. In some embodiments, the computer 50 can perform the projection using the geometric model described in EQN. 4, which can be constructed from the camera poses corresponding to the two consecutive images.

In some embodiments, the difference in the locations of the first and the second points 602 and 604 can represent an error in the estimated camera poses. The geometric model described in EQN. 4 can be used by the computer 50 to provide a constraint on two consecutive camera poses, such that by reducing or minimizing the error in the constraint, the computer 50 can also minimize the error in the camera poses.

Although certain aspects of this disclosure have been described in connection with the use of extracted local image features which appear as dots in FIG. 1B, aspects of this disclosure are not limited thereto. For example, other methods for fine-grained data association between consecutive images can also be used. One such method can use direct image pixel comparison. Another such method can use detected wheel points.

In some embodiments, the computer 50 can be configured to filter a vehicle based on the number of local image features detected in the image. A vehicle with few local image feature correspondences is more likely to have an incorrect match. The geometric consistency of a set of matched points can be obtained using a 2D homography. But at least four points are required, and geometric consistency drops with fewer points. In some embodiments, a threshold at five points extracted in each of the two images can be effective.

5. Camera Intrinsics

In some embodiments, a calibration process can provide the camera intrinsics used to construct the homography of EQN. 2. Camera intrinsics define the geometric transform from a 2D normalized point to a 2D image point. EQN. 2 is defined for a pinhole model camera, that is, with the camera matrix, K, composed of the camera focal length and the principal point. Alternatively, for a camera model with nonlinear distortion, D( ), EQN. 2 becomes:

$$\hat{x}_j = K * D\left(\left(^{cam t1}R\right)_{cam t0} * D^{-1}\left(K^{-1} * x_i\right)\right) \qquad \text{Equation (5)}$$

6. Change in Camera Orientation

In some applications, an optimization using static scene objects provides the camera pose that corresponds to $\Delta R$ in EQN. 2. In this context, the pose of a camera located on an autonomous vehicle 5 can be estimated from static objects in an HD map by aligning their projected locations to the corresponding 2D detected locations in images captured by the camera. In contrast to the method described herein, in which dynamic objects are used to estimate the change in the camera orientation, both the orientation and the position are estimated using static objects. All six degrees-of-freedom (DoF) of a camera pose include three variables for the orientation (i.e., roll, pitch, yaw) and three variables for the translation (i.e., x, y, z). The three variables for the orientation are what are used to compute $\Delta R$ in EQN. 2.

Another source of $\Delta R$ is the source described herein: through the application of optimization over EQN. 3, given data for the other five dependencies listed above. In general, EQN. 4 provides a precise mathematical model through which the values for any of the six dependencies could be estimated using an optimization. Camera pose estimation is, however, the primary application described herein because that application addresses key limitations in the use of static objects for camera pose estimation. The next section describes application-specific use-cases for this model.

Applications

The estimation of the camera pose using the techniques described herein can have a number of different applications within the context of an autonomous vehicle 5. Examples of these applications include: 1) supplementing camera pose estimation with more constraints to effect higher fidelity and robustness; 2) estimating the orientation of a camera from a previous frame when the latter camera orientation is not yet known, 3) as a metric to evaluate the accuracy of an estimated change in the camera orientation, and 4) estimating the relative position and velocity of a dynamic object.

1. Supplementing Camera Pose Estimation

A first application of the model described in EQN. 4 can be to supplement camera pose estimation with more constraints. That is, camera poses can be estimated using a combination of a) pose constraints from the visible static objects and b) orientation constraints from the visible dynamic objects. As described below, static objects can be an insufficient source of information for camera pose estimation on a highway, but the supplemental use of dynamic objects can be an effective remedy.

A) Camera Pose Estimation Using Static Objects

Figure 1C:
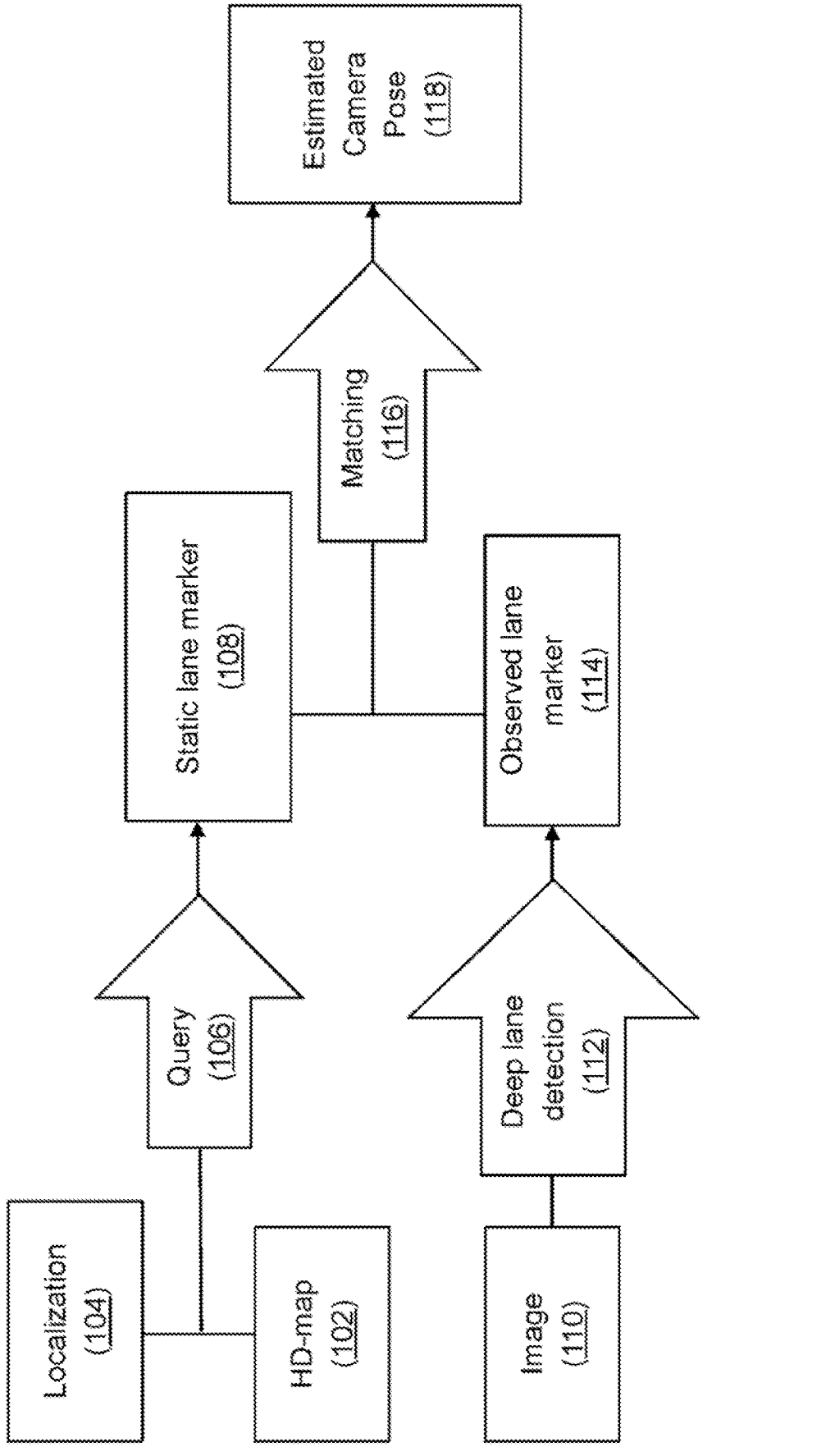
FIG. 1C shows a block diagram of a process that can be used to estimate a pose of a camera located on or in a vehicle.

One approach for camera pose estimation in autonomous driving can be based on the use of pose constraints with static objects. FIG. 1C shows a block diagram of a process that can be used to estimate a pose of a camera located on or in a vehicle using static objects. A camera's pose can be estimated in real-time as an autonomous vehicle 5 traverses a road. The roof of the cab of an autonomous vehicle 5 can be equipped with a plurality of cameras in order to capture images of the region towards which the autonomous vehicle 5 is being driven.

On the top part of FIG. 1C, at the operation 102, the camera pose estimation technique includes a high-definition (HD) map that can store information about the lane markers (shown as 210a, 210b in FIG. 2) on a road. The HD map can store information such as the three-dimensional (3D) world coordinates of the four corners (shown as 212a-212b in FIG. 2) of each lane marker. The HD map can be stored in a computer (e.g., on the memory 75 of the computer 50) located in an autonomous vehicle 5, where the computer 50 performs camera pose estimation techniques.

At the operation 104, the localization can include a global positioning system (GPS) transceiver located in the autonomous vehicle 5 that can provide an approximate 3D position of the autonomous vehicle 5. The computer 50 located in the autonomous vehicle 5 can receive the position of the autonomous vehicle 5 and can query (shown in the operation 106) the HD map (shown in the operation 102) to obtain the 3D position of the corners of lane markers that can be located within a predetermined distance (e.g., 100 meters) of the autonomous vehicle 5. Based on the query (the operation 106), the computer 50 can obtain position information about the corners of the lane markers. At the operation 108, the position information of the corners of each lane marker can be considered static lane marker information.

On the bottom part of FIG. 1C, at the operation 110, the camera pose estimation technique includes an image that is obtained from a camera located on or in the autonomous vehicle 5. The computer 50 located in the autonomous vehicle 5 can obtain the image (the operation 110) from the camera and can perform a deep learning lane detection technique at the operation 112, to identify the lane makers and the two-dimensional position of the corners of the lane markers in the image (the operation 110). Each identified lane marker and the pixel location of the corners of each lane marker in the image (the operation 110) can be considered an observed lane marker at the operation 114. In some embodiments, the deep learning lane detection technique can be the operation of a convolutional neural network (CNN).

In some embodiments, the computer located in the autonomous vehicle 5 can perform data and image processing to obtain the static lane marker (the operation 108) and the observed lane marker (the operation 114) every 100 milliseconds. The computer 50 located in the autonomous vehicle 5 can perform the matching operation (the operation 116) to minimize the distance from the projected 3D world coordinates of at least one corner of a lane marker obtained from the HD map and the 2D pixel location of at least one corner of the corresponding lane marker in the image. The matching operation (the operation 116) can provide a best match or best fit between the lane marker obtained from the image and the corresponding lane marker obtained from the HD map. By minimizing the distance between a projected lane marker from the HD map and a corresponding lane marker from the image, the computer can obtain an estimated camera pose at the operation 118. The estimated camera pose can include values for the six DoF variables that describe a camera's pose.

Figure 2:
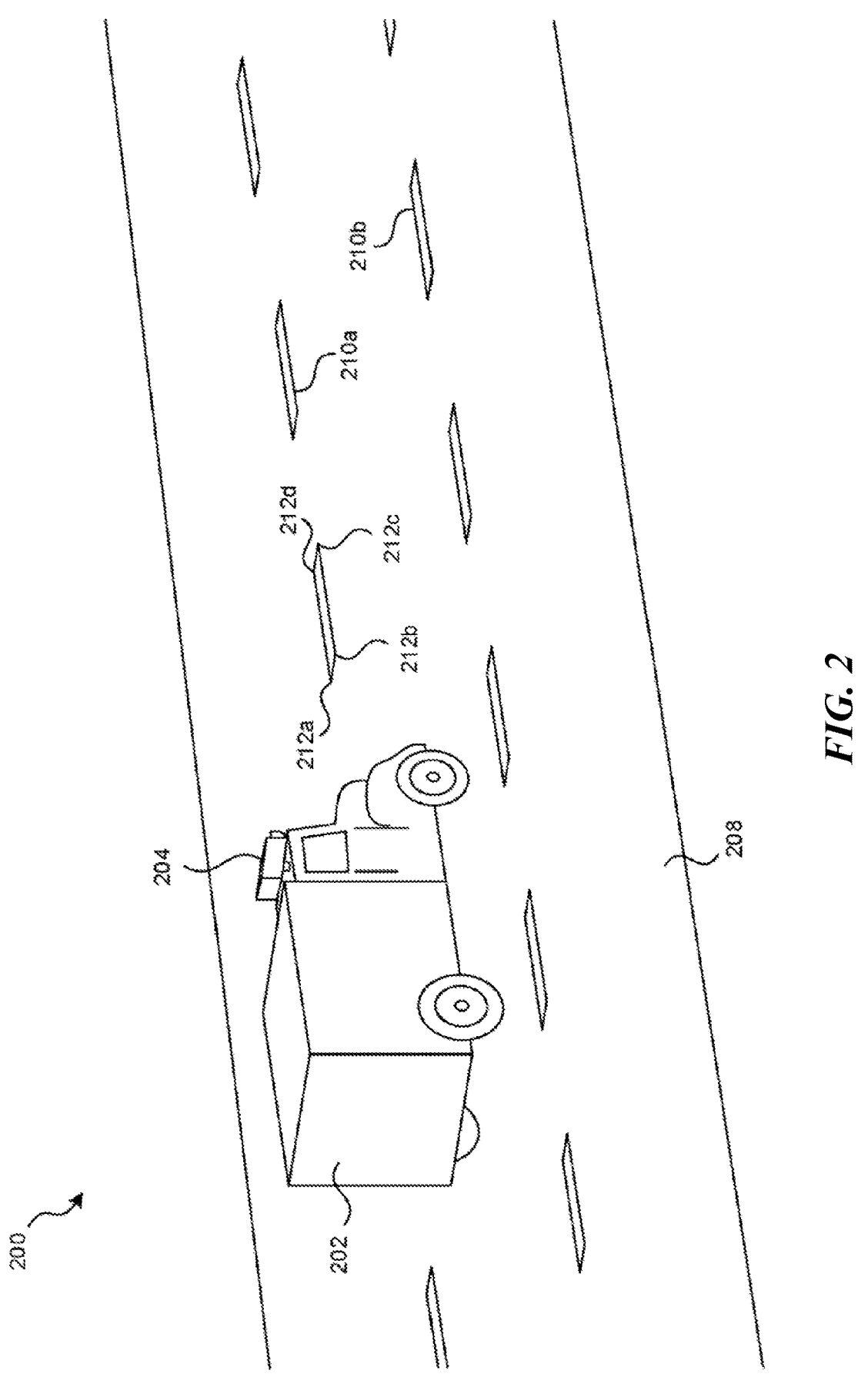
FIG. 2 shows a system that includes a vehicle on a road, where the vehicle includes a plurality of cameras.

FIG. 2 shows a system 200 that includes a vehicle 202 on a road 208, where the vehicle 202 includes a plurality of cameras. In FIG. 2, a single camera 204 is shown for ease of description. However, the plurality of cameras can be located in or positioned on the vehicle 202 to obtain images of the road 208 that includes the lane markers 210a, 210b as the vehicle 202 is driven. The camera pose estimation techniques described herein for the camera 204 can be applied to estimate the pose of other cameras located on the vehicle 202. The vehicle 202 can be an autonomous vehicle, such as the autonomous vehicle 5 of FIG. 1A.

The road 208 includes lane markers 210a, 201b that can be affixed on either side of the road 208. The lane markers include a first set of lane markers 210a located on a first side of the road 208, and a second set of lane markers 210b located on a second side of the road 208 opposite to the first side. Each lane marker can include a plurality of corners 212a-212d (e.g., four corners for a rectangular lane marker). As described in FIGS. 1A and 1B, a computer 50 can be located in the vehicle 202, where the computer 50 can include an HD map that includes the 3D world coordinates of the corners of each lane marker. In each set of lane markers, one lane marker can be separated from another lane marker by a predetermined distance to form a set of broken lines on the road. A lane marker 210a, 210b can have a rectangular shape and can have a white color or the lane marker 210a, 210b can have another shape (e.g., square, polygon, etc.) and can have a color (e.g., black, white, red, etc.). As shown in FIG. 2, the first and second set of lane markers 210a, 210b can be parallel to each other.

As described herein, the use of lane markings provides one method for camera pose estimation on an autonomous vehicle, yet in some embodiments that methodology reaches key limitations in accuracy and robustness. The fidelity of the camera pose pitch estimate is, for example, limited to the distance in front of the autonomous vehicle 5 at which the computer 50 can detect lane markings. In some embodiments, that limit is 250 m. The camera pose estimate is also affected by errors in the accuracy of the 2D detections of lane markings and in the 3D locations of the lane markings within the HD map. There are also circumstances during which camera pose estimation based on the use of lane markers is difficult and error-prone, including: when lane markings are occluded by other vehicles and objects; lane markers being worn away; during poor light conditions (e.g., at night and in sun-glare); when the autonomous vehicle 5 is at an intersection; and when the autonomous vehicle 5 goes over bumps in the road. Therefore, the use of lane markers are often not by themselves sufficient for camera pose estimation for an autonomous driving vehicle.

b) Adding Dynamic Objects To Camera Pose Estimation

Camera pose estimation can be improved with the addition of constraints from dynamic objects as defined in EQN. 3. That is, constraints on dynamic objects are added to the set used for camera pose estimation such that the optimization finds the camera pose that satisfies all constraints (on both static and dynamic objects) simultaneously.

Figure 3:
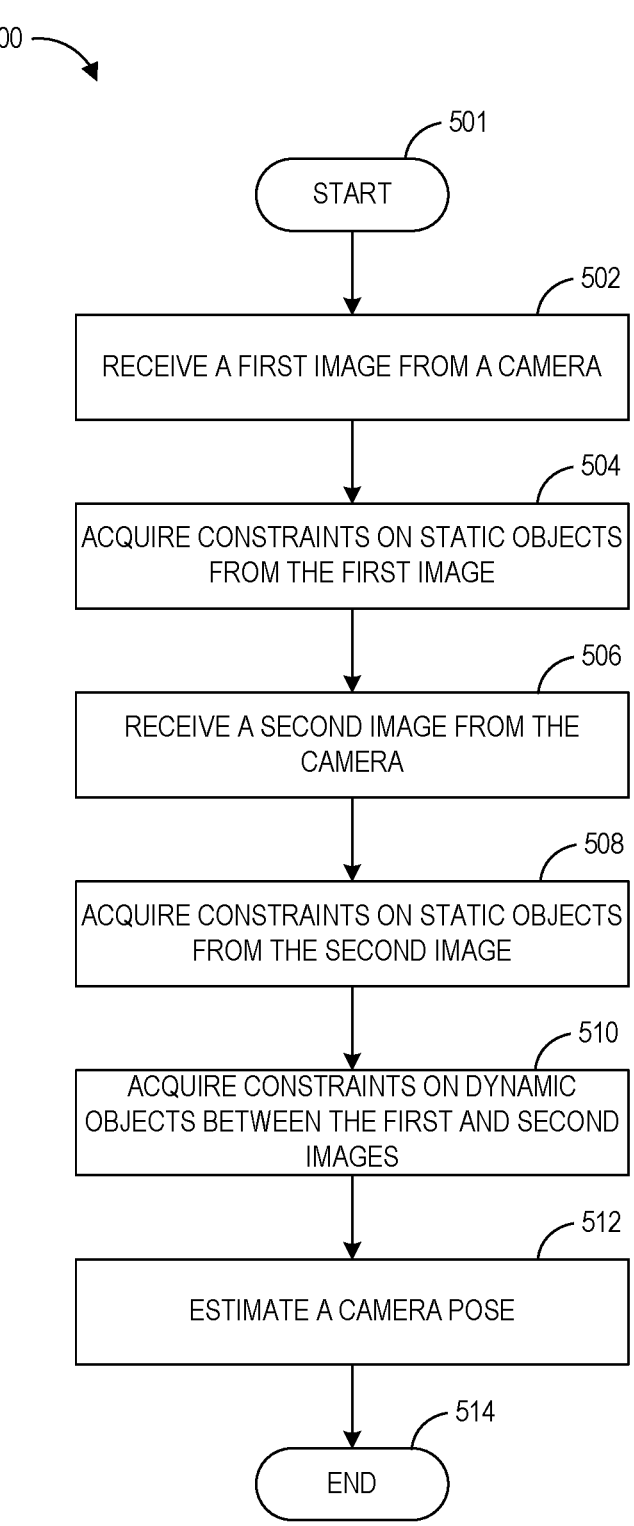
FIG. 3 is a flowchart illustrating an exemplary method for estimating camera poses in accordance with aspects of this disclosure.

FIG. 3 is a flowchart illustrating a method 500 for estimating a camera pose in accordance with aspects of this disclosure. With reference to FIG. 3, one or more blocks of the method 500 can be implemented, for example, by a processor such as the computer 50 of the autonomous vehicle 5. The method 500 begins at block 501.

At block 502, the processor can receive a first image from a camera of an autonomous vehicle 5. At block 504, the processor can acquire constraints from static objects detected in the first image. In some embodiments, the static objects can include lane markers detected within the first image.

At block 506, the processor can receive a second image from the camera. At block 508, the processor can acquire constraints from static objects detected in the second image. At block 510 the processor can acquire constraints from one or more dynamic objects detected in both the first and the second image. The dynamic objects can include vehicles traveling in the same direction as the autonomous vehicle 5. In other embodiments, the dynamic objects can include any objects that are sufficiently far away from the autonomous vehicle 5. In some embodiments, the processor can also compute a geometric constraint on the camera poses based on one or more dynamic objects detected in the first and the second images.

At block 512, the processor can estimate the pose of the camera using the collection of constraints on both static and dynamic objects. The method 500 ends at block 512.

This application of dynamic objects for camera pose estimation is advantageous for multiple reasons: i) it can mitigate some of the limitations in the use of some types of static objects; ii) it can provide more information; iii) it can be more accurate; and iv) it can be an only alternative, as described in more detail below:

i) Mitigating Some Limitations in the Use of Static Objects

The few dependencies of the mathematical model described herein can lead to improved robustness of the overall camera pose estimation process. The model has a different, reduced set of dependencies to those of static lane marks. The use of dynamic objects does not, for example, depend on an HD map, which can be an independent source of error. The detections of vehicles also can be less error prone for a number of reasons, for example: 1) vehicles stand orthogonally to a camera's direction of view; 2) vehicles are self-lit at night; and 3) vehicles can be less prone to be mislabeled compared to some static objects. Lane markings, on the other hand: 1) stand nearly parallel to the direction of view; 2) need light from an external source to be visible at night; and 3) road tar is often mislabeled as lane markings due to sun-glare at certain times in the day.

ii) More Information

The use of dynamic objects can be advantageous for camera pose optimization simply because those constraints add more information. Objects in an HD map can be sparse, ambiguous, hard to see, and/or nonexistent. There are few lane markings in many intersections. In other places roads are not always well-labeled. When they are, lane markings and other HD map features are often occluded at periods of congestion, or when surrounded by multiple large vehicles.

iii) More Accurate

In some embodiments, the use of dynamic objects for camera pose estimation can lead to higher accuracy due to the greater visible range of vehicles. In some embodiments, the camera can detect vehicles beyond 1000 m away. A high-fidelity camera pitch can be found by accurately aligning 2D image features on vehicles at that distance. Lane markings can be, in contrast, only visible up to 250 m away. Similarly, LiDAR scans can also be capped to only a few hundred (i.e., 200-400) meters away.

iv) An Only Alternative

Some environments have limited alternative types of static objects for camera pose estimation, which can be remedied by the use of the model described herein. Many types of static objects along roadways (e.g., traffic signs, poles, and buildings) can be, for example, sparse along long-haul trucking routes. Yet, other vehicles can be nearly as ubiquitous on roadways as lane markings. A high-fidelity camera pose estimate is typically most important when other vehicles are in the vicinity.

2. Estimating the Orientation of a Camera From a Previous Frame

A second application of the model described in EQN. 4 can be to estimate the orientation of a camera in a new frame after the orientation of the camera has already been computed in a previous frame. In this case, the change in camera orientation, $\Delta R$, is the composition of the known orientation at a first frame, $$^{cam\ t0}R_{world}^T,$$

and the unknown camera orientation at a second frame, $^{cam\ t1}R_{world}$. An application of EQN. 4 for camera pose estimation thus results in a solution for $^{cam\ t1}R_{world}$. The consecutive application of the model can produce a sequence of relative camera orientations between multiple frames. Without the use, however, of static scene objects, the absolute camera orientation can accumulate error over each frame. Thus, this application can be most suited to situations wherein static camera pose estimation is unavailable for a short period of time, such as when an autonomous driving vehicle drives off a map in a new construction zone.

3. As a Metric of Camera Pose Accuracy

A third application of the model described in EQN. 4 can be to establish a confidence in the camera pose estimate. Independently of optimization, the projections of EQN. 4 should match ground truth points if the camera pose is accurate. The magnitude of the residual of that comparison can indicate a confidence in the accuracy of the camera pose estimate. Consumers of the camera pose running on the computer 50 (e.g., modules for tracking, depth estimation, and speed estimation of objects) can filter camera pose estimates with low confidence.

A method for camera pose confidence based on the use of dynamic objects can result in more cases of inaccurate camera poses being caught. EQN. 4 can provide a higher-fidelity evaluation metric of the camera pose accuracy than one based on the use of some types of static objects due to their farther visible range. Also, this method for camera pose confidence is not susceptible to the same limitations of lane markings as described herein.

4. Estimating Vehicle Kinematics

A fourth application of the model described in EQN. 4 can be to estimate the kinematics of a vehicle in view. The computer 50 can generate an estimate of the position and the velocity of another vehicle within the field of view of the camera for which the computer 50 does not yet have a good estimate. This can be effective for vehicles on curves and hills, for which the position and the velocity can be more observable. In this application, the camera pose estimates can be already known, and the optimization be for the kinematic correction of EQN. 4, as:

$$\underset{\Delta P}{\arg\min} = \sum \left\| x_j - \underset{\Delta P}{\pi}(x_i) \right\|^2 \qquad \text{Equation (6)}$$

Conclusion

Though much of this document refers to an autonomous truck, it should be understood that any autonomous ground vehicle can have such features. Autonomous vehicles which traverse over the ground can include: semis, tractor-trailers, 18 wheelers, lorries, class 8 vehicles, passenger vehicles, transport vans, cargo vans, recreational vehicles, golf carts, transport carts, and the like.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components can be combined or integrated in another system or certain features can be omitted, or not implemented.

In addition, techniques, systems, subsystems, and methods described and illustrated in the various embodiments as discrete or separate can be combined or integrated with other systems, modules, techniques, or methods without departing from the scope of this disclosure. Other items shown or discussed as coupled or directly coupled or communicating with each other can be indirectly coupled or communicating through some interface, device, or intermediate component whether electrically, mechanically, or otherwise. Other examples of changes, substitutions, and alterations are ascertainable by one skilled in the art and could be made without departing from the spirit and the scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A method comprising:
receiving a first image from a camera of an autonomous vehicle;
acquiring first camera pose constraints based on one or more static objects detected in the first image;
receiving a second image from the camera;
acquiring second camera pose constraints based on one or more static objects detected in the second image;
acquiring third camera pose constraints based on one or more dynamic objects detected in both the first and the second images; and
estimating at least one pose of the camera that satisfies the first camera pose constraints, the second camera pose constraints, and the third camera pose constraints.

2. The method of claim 1, wherein the one or more dynamic objects comprise vehicles traveling in a similar direction as the autonomous vehicle.

3. The method of claim 2, wherein the vehicles traveling in a similar direction as the autonomous vehicle are at least a threshold distance from the autonomous vehicle.

4. The method of claim 3, wherein the threshold distance is 75 meters.

5. The method of claim 1, further comprising:
detecting locations of the one or more dynamic objects in the first and the second images;
matching 2D points that are detected on the one or more dynamic objects in the first image to 2D points that are detected on each same of the one or more dynamic objects in the second image;

estimating a homography from orientations of a first camera pose associated with the first image and a second camera pose associated with the second image;
projecting the 2D points on the one or more dynamic objects in the first image to the second image;
correcting the location of each projected 2D point using a kinematic estimate of the one or more dynamic objects; and
minimizing an error between the location of the projected 2D point to the location of the detected 2D point in the second image.

6. The method of claim 5, wherein correcting the location of each projected 2D point comprises:
receiving an estimate of a 3D position and a 3D velocity for each of the one or more dynamic objects;
projecting each of the 3D position and velocity estimates into one of the first and second images to get a 2D vector; and
adding the 2D vector to each projected 2D point on a same dynamic object of each of the one or more dynamic objects.

7. The method of claim 5, wherein estimating the homography is simplified due to one or more assumptions regarding relative motion between the autonomous vehicle and the one or more dynamic objects.

8. The method of claim 1, wherein the one or more static objects comprise stationary lane markings.

9. The method of claim 8, wherein estimating the at least one pose of the camera comprises aligning the stationary lane markings in one of the first and the second images with lane markings from a projected 3D map of a roadway.

10. The method of claim 1, further comprising:
detecting the one or more dynamic objects in the first and the second images;
identifying a subset of the one or more dynamic objects that are within a threshold distance of the autonomous vehicle; and
removing the subset of the one or more dynamic objects from an estimation of at least one of the poses of the camera.

11. The method of claim 1, further comprising:
extracting local image features for the one or more dynamic objects detected in the first and the second images; and
matching the one or more dynamic objects between the first and the second images based on the extracted local image features.

12. The method of claim 1, further comprising:
causing the autonomous vehicle to navigate a roadway based at least in part on the estimation of the poses of the camera.

13. An apparatus comprising:
at least one processor; and
at least one memory including computer program code, the at least one memory and the computer program code configured to, with the at least one processor, cause the apparatus to:
receive a first image from a camera of an autonomous vehicle;
acquire first camera pose constraints based on one or more static objects detected in the first image;
receive a second image from the camera;
acquire second camera pose constraints based on one or more static objects detected in the second image;
acquire third camera pose constraints based on one or more dynamic objects detected in both the first and the second images; and estimate at least one pose of the camera that satisfies the first camera pose constraints, the second camera pose constraints, and the third camera pose constraints.

14. The apparatus of claim 13, wherein the computer program code is further configured to cause the apparatus to:

extract one or more features for each of the one or more dynamic objects in the first and the second images; and match the one or more dynamic objects in the first and the second images based on the extracted one or more features.

15. The apparatus of claim 14, wherein the estimation of the at least one the pose of the camera is further based on the extracted one or more features for the matched one or more dynamic objects.

16. The apparatus of claim 13, wherein the computer program code is further configured to cause the apparatus to:

determine a relative position and velocity of each of the one or more dynamic objects with respect to the autonomous vehicle, wherein estimating the at least one the pose of the camera is further based on correcting locations of the one or more dynamic objects based on the relative position and velocity.

17. A non-transitory computer-readable medium storing computer program instructions which, when executed by at least one processor, cause the at least one processor to:

receive a first image from a camera of an autonomous vehicle;

acquire first camera pose constraints based on one or more static objects detected in the first image;

receive a second image from the camera;

acquire second camera pose constraints based on one or more static objects detected in the second image;

acquire third camera pose constraints based on one or more dynamic objects detected in both the first and the second images; and estimate poses of the camera that satisfy the first camera pose constraints, the second camera pose constraints, and the third camera pose constraints.

18. The non-transitory computer-readable medium of claim 17, wherein the estimation of the at least one of the pose of the camera is further based on a simplification of relative motion between the autonomous vehicle and the one or more dynamic objects.

19. The non-transitory computer-readable medium of claim 18, wherein the simplification involves assuming a location for the one or more dynamic objects is in a plane at a distance of infinity from the autonomous vehicle.

20. The non-transitory computer-readable medium of claim 17, wherein the one or more dynamic objects comprise vehicles traveling in a similar direction as the autonomous vehicle.

\* \* \* \* \*